(12) United States Patent
Chang et al.

(10) Patent No.: US 12,478,276 B2
(45) Date of Patent: Nov. 25, 2025

(54) SYSTEM FOR TIME-SERIES ANALYSIS OF FLUORESCENCE BLOOD FLOW AND METHOD THEREOF

(71) Applicant: Taipei Medical University, Taipei (TW)

(72) Inventors: Te-I Chang, Taipei (TW); Rui-Cian Weng, Taipei (TW); Yen-Pei Lu, Taipei (TW)

(73) Assignee: Taipei Medical University, Taipei (TW)

( * ) Notice: Subject to any disclaimer, the term of this patent is extended or adjusted under 35 U.S.C. 154(b) by 0 days.

(21) Appl. No.: 18/632,394

(22) Filed: Apr. 11, 2024

(65) Prior Publication Data

US 2025/0176849 A1 Jun. 5, 2025

(30) Foreign Application Priority Data

Dec. 1, 2023 (TW) .................................. 112146926

(51) Int. Cl.
*A61B 5/00* (2006.01)
*A61B 5/0275* (2006.01)

(52) U.S. Cl.
CPC .......... *A61B 5/0275* (2013.01); *A61B 5/0071* (2013.01); *A61B 5/681* (2013.01); *A61B 5/6828* (2013.01); *A61B 5/6831* (2013.01); *A61B 2560/0462* (2013.01); *A61B 2562/0233* (2013.01); *A61B 2562/164* (2013.01); *A61B 2562/185* (2013.01)

(58) Field of Classification Search
CPC ..... A61B 5/0275; A61B 5/0071; A61B 5/681; A61B 5/6831; A61B 2562/164; A61B 5/14556
See application file for complete search history.

(56) References Cited

U.S. PATENT DOCUMENTS

2008/0213904 A1* 9/2008 Sliwa .................... A61B 5/117
436/164

OTHER PUBLICATIONS

"Near-Infrared Fluorescence Imaging in Humans with Indocyanine Green: A Review and Update" by M.V. Marshall et al. Open Surg Oncol J. 2(2):12-25. (Year: 2012).*

(Continued)

*Primary Examiner* — Jason M Ip

(57) ABSTRACT

A system for time-series analysis of fluorescence blood flow includes at least two mobile fluorescent blood flow monitoring devices disposed on the human limbs and processing devices. The movable fluorescent blood flow monitoring device includes the body, a fixed device, a darkroom space, a detection device, a transmission device, and a battery unit. The detection device further comprises at least four LED excitation light sources with a wavelength of 740 nm to 760 nm and a filter receiver. The filter receiver receives reflected fluorescence light with a wavelength of 800 nm to 850 nm to obtain a fluorescent developer signals from human blood perfused tissue, and the cardiac blood flow rate result is calculated by the processing device. A monitoring method is to calculate the cardiac blood flow rate result by the fluorescent developer signal captured by the first and second movable fluorescence blood flow monitoring devices.

2 Claims, 6 Drawing Sheets

(56) References Cited

OTHER PUBLICATIONS

"ICG fluorescence imaging and its medical applications" by M. Miwa et al. 2008 Int Conf Opt Instru Tech. (Year: 2009).*
Jean-Michel I. Maarek et al., Measurement of Cardiac Output with Indocyanine Green Transcutaneous Fluorescence Dilution Technique, Anesthesiology, 2004, pp. 1476-1483, vol. 100, No. 6.

* cited by examiner

SYSTEM FOR TIME-SERIES ANALYSIS OF FLUORESCENCE BLOOD FLOW AND METHOD THEREOF

CROSS-REFERENCE TO RELATED APPLICATION

This application claims the priority benefit of Taiwan application no. 112146926, filed on Dec. 1, 2023, the full disclosure of which is incorporated herein by reference.

BACKGROUND

Technical Field

The current application relates to methods and system of time-series analysis of fluorescence blood flow. More particularly, the application relates to determining postoperative recovery effects based on fluorescent contrast agent signals in the context of time-series analysis of fluorescent blood flow.

Description of Related Art

Currently, cardiac output in patients is estimated using blood pressure, but normal blood pressure does not necessarily indicate sufficient cardiac output. Factors affecting blood pressure include blood volume, vascular resistance, and cardiac preload and afterload, among many complex factors. Although current ultrasound technology allows visualization of cardiac contraction function and estimation of blood flow velocity, the accuracy is influenced by factors such as operator proficiency. In addition, the pulmonary artery catheter (Swan-Ganz catheter) and Pulse-induced Contour Cardiac Output (PICCO), which have been clinically used for many years, provide accurate monitoring of human hemodynamics. However, they require invasive catheter placement, such as specialized designs for pulmonary artery and arterial catheters, which may lead to various complications associated with vascular insertion.

Based on the above, developing a system and monitoring method for time-series analysis of fluorescent blood flow becomes a crucial task in the relevant technical field to address the aforementioned issues. Regarding the method of estimating cardiac output using indocyanine green (ICG) fluorescence concentration, experimental methods proposed by Marrek et al. (Anesthesiology 2004; 100:1476-83) demonstrate a highly correlated linear contrast relationship between the measured ICG concentration in animal blood and the ICG fluorescence signal detected on the surface of animal skin (FIG. 1, 2).

In the experiments, the values of cardiac output estimated by the thermodilution method (Thermodilution, TD), which is calculated using the pulmonary artery catheter technique, showed a highly linear correlation with the method of estimating cardiac output using detected ICG signals (FIG. 3).

This demonstrates that percutaneous detection of ICG fluorescence intensity for estimating cardiac output is a feasible method and is quite consistent with the cardiac output obtained by the thermodilution method commonly used with pulmonary artery catheters. However, the ICG percutaneous fluorescence detector is still susceptible to multiple interference factors such as environmental light and the distance from the object being measured. The present technological invention can further overcome these interference factors by fixing the distance and isolating environmental light. This is complemented by the use of multiple time-series detection points to improve the signal-to-noise ratio and enhance accuracy.

SUMMARY

In one aspect, the present invention is directed to a monitoring method and a monitoring system for time-series analysis of fluorescent blood flow.

The monitoring method for time-series analysis of fluorescence blood flow is provided. The monitoring method for time-series analysis of fluorescence blood flow, used to capture a fluorescent contrast agent signal in human blood, comprises a step 1, a step 2, and a step 3. In the step 1, the first movable fluorescent blood flow monitoring device captures the fluorescent contrast agent signal at an initial position and transmits an initial received time intensity signal to a processing device. In the step 2, the second movable fluorescent blood flow monitoring device captures the fluorescent contrast agent signal at a final position and transmits a final received time intensity signal to the processing device. In the step 3, the processing device calculates a result of cardiac blood flow velocity based on the initial position, initial received time intensity signal, final position, and final received time intensity signal. In these steps, both the first and second movable fluorescent blood flow monitoring devices have a darkroom space for detecting the fluorescent contrast agent signal. Additionally, the first and second movable fluorescent blood flow monitoring devices are separately positioned at either end of the human body.

According to another embodiment, the proximal end of the human body is the upper limb.

According to another embodiment, the distal end of the human body is the lower limb.

According to an embodiment, the monitoring system for time-series analysis of fluorescent blood flow comprises a main body, a fixation device, a darkroom space, a detection device, a transmission device, and a battery unit. The fixation device is positioned on the side of the main body, for securing the fluorescent blood flow monitoring device to the proximal or distal end of the human body. The darkroom space is positioned on one side of the main body to conform to the skin of the proximal or distal end of the human body. The detection device is positioned on the side of the darkroom space away from the proximal or distal end of the human body. The detection device further comprises at least two near-infrared led light sources and a filter receiver, wherein the filter receiver is obtained a fluorescent contrast agent signal by reflecting light onto the skin of the proximal or distal end of the human body through near-infrared led light sources. The transmission device positioned within the main body, for signal connection with the detection device to transmit the fluorescent contrast agent signal to the processing device. The battery unit positioned within the main body, for providing power to the detection device and the transmission device. The above-mentioned processing device is calculated a cardiac blood flow velocity result after receiving the above-mentioned fluorescent developer signal.

According to another embodiment, the monitoring system for time-series analysis of fluorescent blood flow further comprises a fluorescence imaging sensor for capturing an image of a fluorescent tracer to measure a circulatory pathway.

According to an embodiment, a movable fluorescent blood flow monitoring device selectively fixed at a proximal or distal end of a human body, comprises a main body with a darkroom space, a fixation device, a detection device, a transmission device, and a battery unit.

To sum up, the effect of the present invention is to stimulate the fluorescent developer to emit a specific near-infrared fluorescent waveband through a light source, and to use a detection device to capture the fluorescent developer signal with high specificity. Through multi-point detection, the transcutaneous measurement is calculated as the ratio of the peak intensity of the two-point light/time difference. This involves the calculation of the fluorescence intensity at multiple points, the time difference and curve between fluorescence peaks, and the elongation or compression of the waveform. Consequently, blood flow velocity and dynamic information are obtained, improving the reduction of potential interference noise compared to single-point collection within the body.

BRIEF DESCRIPTION OF THE DRAWINGS

In order to make the above-described technology of this disclosure, as well as other aspects, features, advantages, and embodiments, more apparent and understandable, the description of the accompanying drawings is provided as follows.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

To provide a more detailed explanation of various embodiments of the present invention, the following is accompanied by drawings for illustration. It should be understood that when an element is referred to as being "connected" or "disposed" on another element, it can indicate that the element is directly located on the other element, or there may be an intermediate element connecting the element to the other element. Conversely, when an element is described as being "directly on" or "directly connected to" another element, it is explicitly defined that there is no intermediate element involved.

Additionally, terms such as "first," "second," "third," and similar terms are used solely for the purpose of distinguishing one element, component, region, or portion from another, and do not necessarily imply a chronological order. Furthermore, relative terms like "below" and "above" may be used to describe the relationship of one element to another in this disclosure. It should be understood that these relative terms are intended to encompass orientations other than those depicted in the Figs. For example, if a device in a drawing is flipped, the component described as being "below" another component would now be oriented "above" the other component. This is indicative of a relative positional relationship rather than an absolute orientation.

Figure 1:
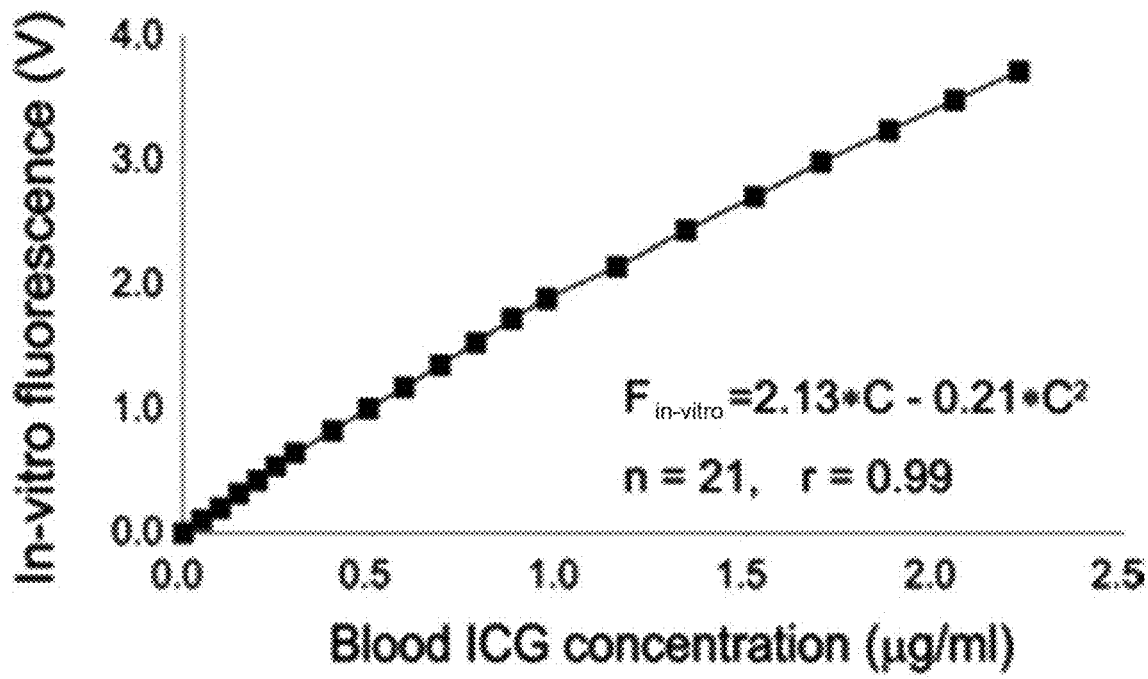
FIG. 1 illustrates the correlation between icg blood concentration and ex-vivo fluorescence intensity.
Figure 2:
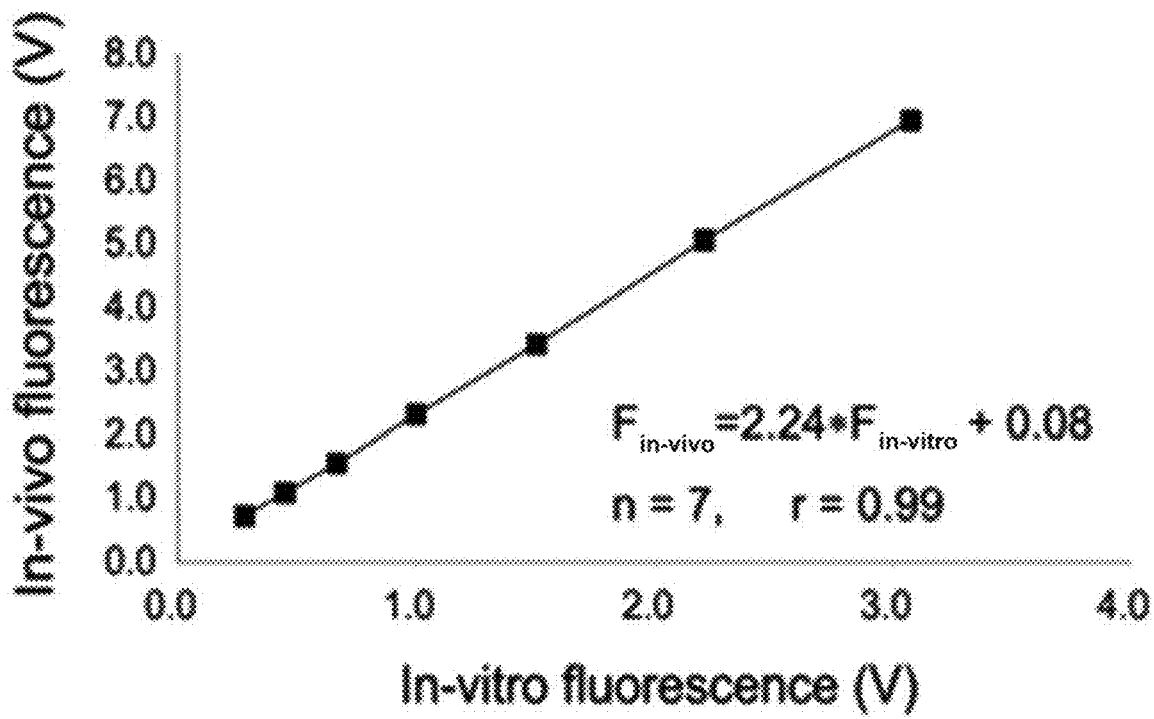
FIG. 2 illustrates the correlation between ex-vivo icg fluorescence intensity and epidermal fluorescence intensity.
Figure 3:
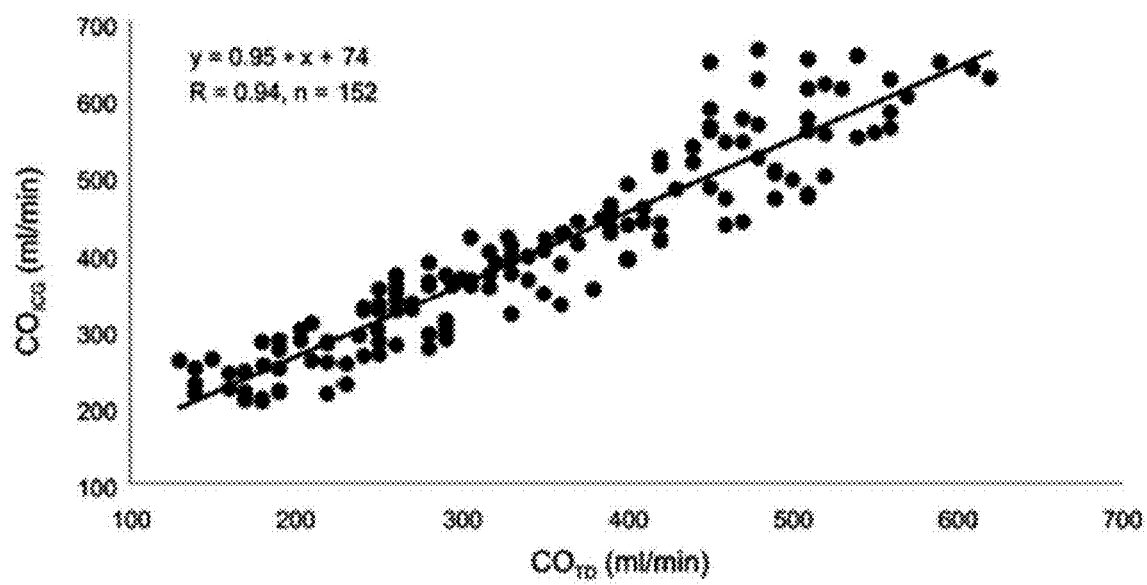
FIG. 3 illustrates the correlation between cardiac output estimated by the thermodilution method and the ICG detection method.
Figure 4:
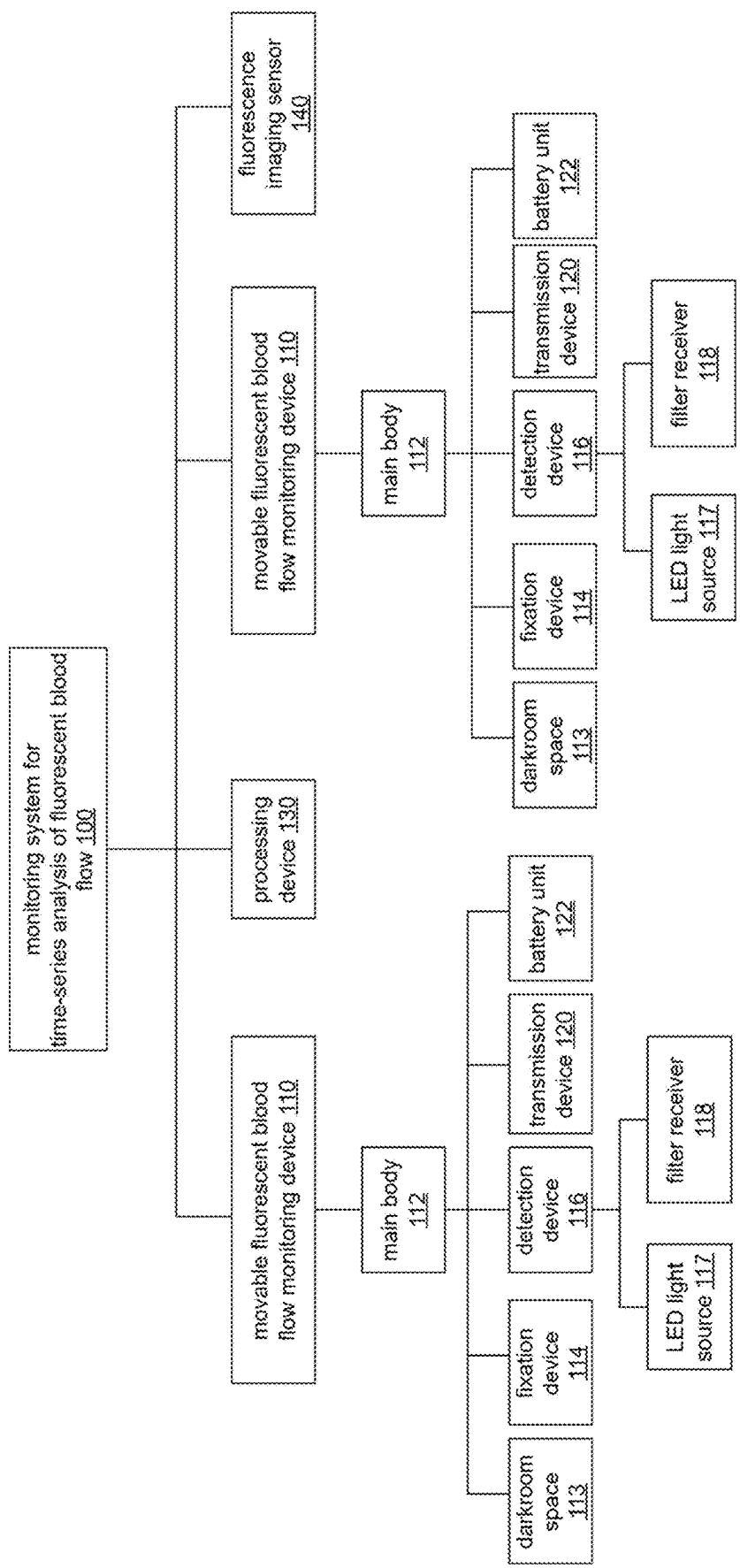
FIG. 4 is a functional block diagram of a monitoring system for time-series analysis of fluorescent blood flow according to one embodiment of this invention.
Figure 5:
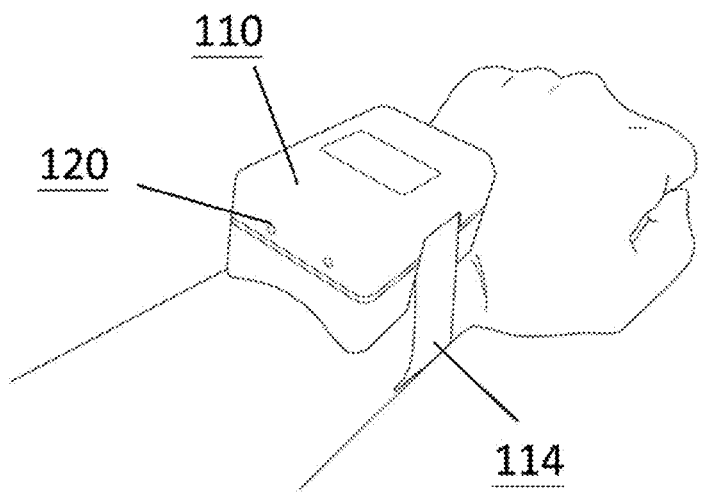
FIG. 5 is a schematic illustration of a movable fluorescent blood flow monitoring device positioned on the hand according to one embodiment of this invention.
Figure 6:
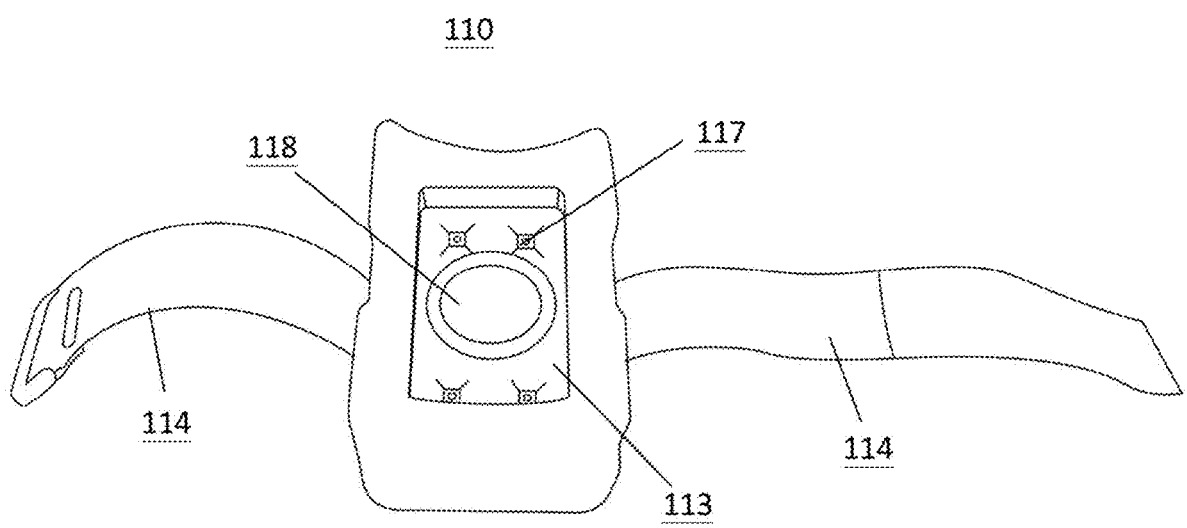
FIG. 6 is a schematic diagram illustrating the structure of the movable fluorescent blood flow monitoring device according to one embodiment of this invention.
Figure 7:
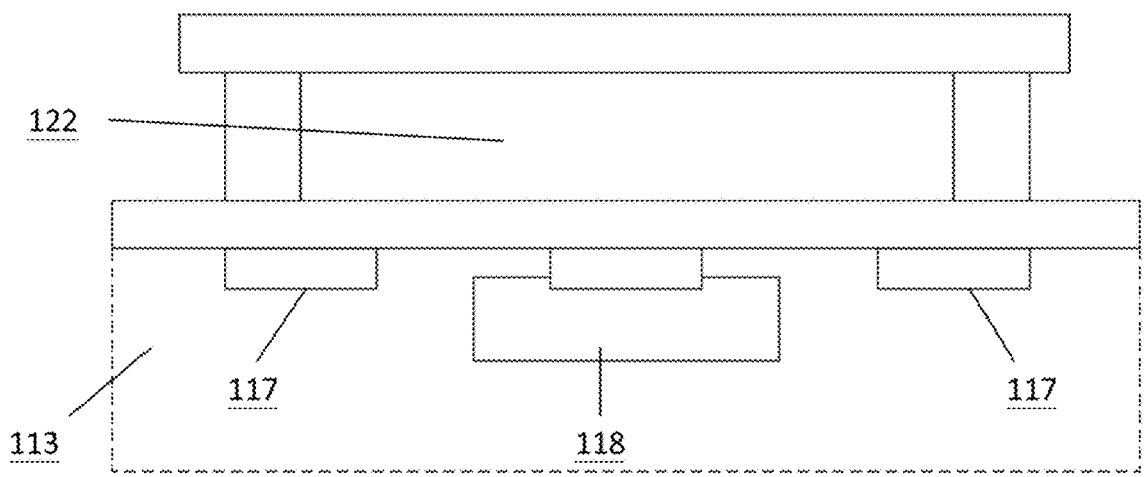
FIG. 7 is a side view of the movable fluorescent blood flow monitoring device according to one embodiment of this invention.
Figure 8:
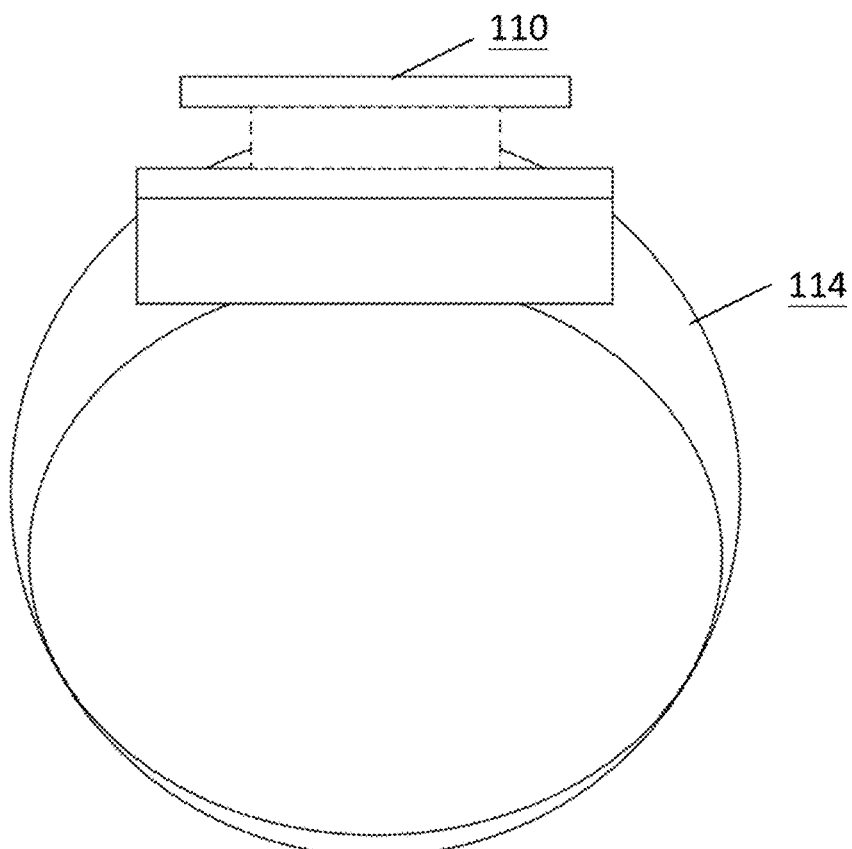
FIG. 8 is a side view of the movable fluorescent blood flow monitoring device according to one embodiment of this invention.

Referring to FIGS. 4 to 8, the present invention provides a monitoring system 100 for time-series analysis of fluorescent blood flow. The system includes at least two movable fluorescent blood flow monitoring devices 110 positioned at the proximal or distal ends of a human body (as shown in FIG. 2), a processing device 130, and a fluorescence imaging sensor 140. The movable fluorescent blood flow monitoring devices 110 can be secured at any position on the proximal or distal ends of the human body, where the proximal end is the upper limb, and the distal end is the lower limb. The movable fluorescent blood flow monitoring device 110 comprises: a main body 112, a fixation device 114, a darkroom space 113, a detection device 116, a transmission device 120, and a battery unit 122. The processing device 130 (e.g., a computer, etc.) receives the transmitted fluorescent contrast agent signal from the movable fluorescent blood flow monitoring device 110 and calculates the result of cardiac blood flow velocity. The fluorescence imaging sensor 140 is used to capture an image of the fluorescent substance to measure the circulatory pathway, for example, a fluorescence microscope with a fluorescence filter block rotating on the objective lens, connected to a digital camera.

The fluorescent contrast agent used is Indocyanine Green (ICG), which is a non-radioactive fluorescent dye with a half-life of 150 to 180 seconds. ICG becomes photochemically stable after binding to serum proteins (lipoproteins, albumin, etc.) in the plasma. ICG is selectively absorbed by the liver in the bloodstream and is not excreted through the enterohepatic or renal circulation. It is excreted only from the liver into the bile, making it suitable for measuring liver function through parameters such as blood retention rate, plasma disappearance rate, or liver blood flow, as well as for conducting circulatory function examinations using an indicator dilution method. The absorption wavelength of ICG is 750-810 nm, falling in the near-infrared region. The fluorescence emitted after absorption has a wavelength around 840 nm. In serum, ICG's maximum absorption is approximately 805 nm, and the maximum fluorescence emission is around 835 nm.

Indocyanine Green is dissolved only using specially prepared physiological saline (sterile injection water) with a pH of 5.5-6.5 to dissolve the dye. It should not be diluted with solutions containing salt (saline, Ringer's solution, etc.) as this may lead to dye precipitation.

The fixing device 114 is set on the side of the main body 112 to secure the fluorescent blood flow monitoring device to the proximal or distal end of the human body. The darkroom space 113 is made of elastic material, surrounding the main body 112, and forming an open side to adhere to the skin of the proximal or distal end of the human body. The detection device 116 is placed in the darkroom space 113 away from one side of the proximal or distal end of the human body. The detection device 116 further comprises at least two wavelength 740 nanometers (nm) to 760 nanometers (nm) near-infrared LED light sources 117 and a filter receiver 118. The near-infrared LED light sources 117 are used to let the filter receiver 118 pass through the LED light source 117 to illuminate the skin of the proximal or distal end of the human body and let the fluorescence with a wavelength of 800 nm to 850 nm penetrate while blocking light of other wavelengths to obtain a fluorescent contrast agent signal. The transmission device 120 is placed inside the main body 112, and electrically connected to the detection device 116 (e.g., Bluetooth). The transmission device 120 comprises a wireless communication unit, which is configured to transmit the fluorescent contrast agent signal to the aforementioned processing device 130 via wireless communication. The battery unit 122 is placed inside the main body 112 to provide power to the detection device 116 and the transmission device 120. The main body with a darkroom space (i.e., the main body 112) is a rectangular box made of fine elastic material, with an open bottom, four concave surfaces, and conforms to the curvature of the limbs, covering the skin, forming the darkroom space 113, and placed at any position on the user's limbs to detect the fluorescent contrast agent signal. The filter receiver 118 only allows the reflected light with a wavelength of 800 nm to 850 nm to pass through, and light of other wavelengths is blocked.

Furthermore, according to an embodiment of the present invention, the monitoring method for time-series analysis of fluorescence blood flow is explained for capturing the fluorescence contrast agent signal in human blood. The monitoring method for time-series analysis of fluorescence blood flow comprises a step 1, a step 2, and a step 3. In the step 1, the first movable fluorescent blood flow monitoring device 110 captures the fluorescence contrast agent signal at the initial position, and transmits the initial received time intensity signal to the processing device. In the step 2, the second movable fluorescent blood flow monitoring device 110 captures the fluorescence contrast agent signal at the final position and transmits the final received time intensity signal to the processing device 130. In the step 3, the processing device 130 calculates a result of cardiac blood flow velocity based on the initial position, initial received time intensity signal, final position, and final received time intensity signal. Both the first movable fluorescent blood flow monitoring device 110 and the second movable fluorescent blood flow monitoring device 110 have a darkroom space 113 for detecting the fluorescence contrast agent signal. Moreover, the first movable fluorescent blood flow monitoring device 110 and the second movable fluorescent blood flow monitoring device 110 are separately placed at the proximal or distal end of the human body.

The result of cardiac blood flow velocity is calculated as (initial received time intensity signal-final received time intensity signal)/(initial position-final position). This can be complemented by a fluorescence imaging sensor 140 to capture the image of the fluorescence agent, providing the length (and circulatory path) obtained by subtracting the initial position from the final position.

Figure 9:
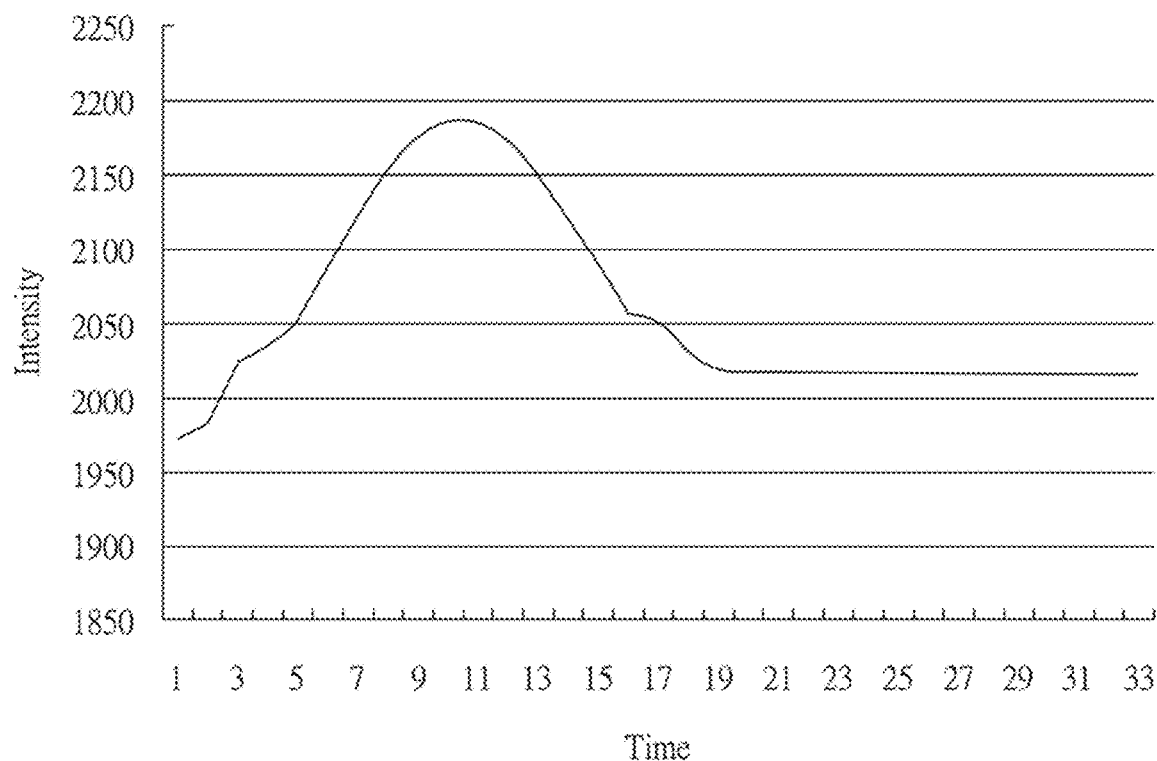
FIG. 9 is a spectral diagram of the fluorescent contrast agent signal during the first circulatory cycle in a pig according to one embodiment of this invention.
Figure 10:
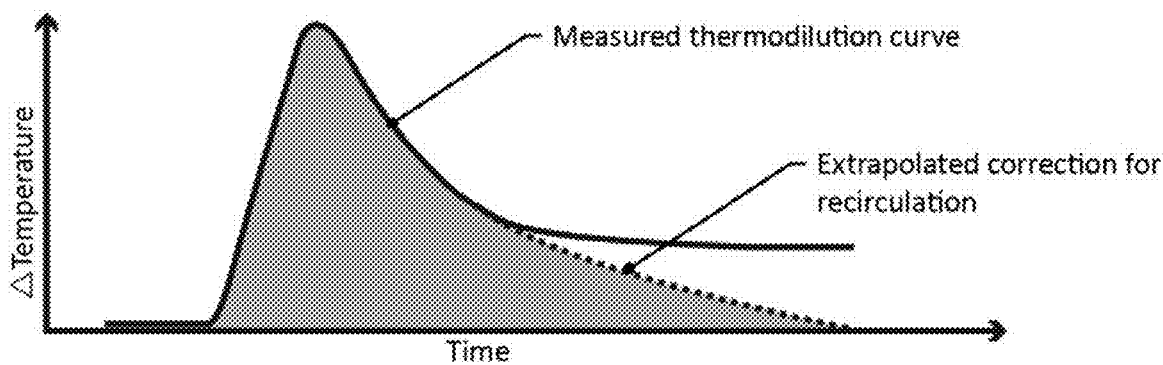
FIG. 10 illustrates the correlation between temperature and ICG concentration in the blood.

Please refer to FIG. 9 and FIG. 10, FIG. 9 shows the spectrum chart of the fluorescence contrast agent signal during one circulatory cycle in accordance with an embodiment of the present invention, where the fluorescence intensity (A.U.) detected transcutaneously can be corrected and converted into intra-body ICG blood concentration. The following Fig, based on the well-known thermal dilution principle (Thermodilution Effect) and the Stewart-Hamilton Equation formula, estimates cardiac output. The change in temperature is replaced by real-time ICG concentration. Since the human body does not produce near-infrared fluorescence itself, and the detection signal of fluorescence is entirely determined by the concentration of ICG dye in the blood, the interference from human tissue is low, leading to improved accuracy. The chart shows the time and fluorescence intensity required for one cycle of the fluorescence contrast agent signal and is converted into a real-time dilution curve of ICG in the blood over time. The processing device can calculate the result of the cardiac blood flow velocity for the pig based on FIG. 9 and the following FIG. 10.

The Stewart-Hamilton Equation formula is given by:

$$Q = \frac{V \times (Tb - Ti) K1 \times K2}{Tb(t)dt}$$

Q is the cardiac output. V is the injection volume. Tb is the blood temperature. Ti is the injection temperature. K1 and K2 are corrections for the specific heat and density of the injected fluid, and the correction for blood and dead space volume. Tb(t)dt represents the integral of blood temperature over time.

In summary, the effectiveness of the present invention lies in measuring the hemodynamic output of the human circulatory blood flow through a time-series analysis of fluorescence. Simultaneously, it enables monitoring tissue perfusion conditions, detecting local circulation disorders, and assisting in the assessment of insufficient blood flow, providing an early warning system.

Additionally, it should be noted that the terms "comprise," "comprising," or any other variations thereof are intended to encompass non-exclusive inclusion. This means that processes, methods, products, or devices comprising a series of elements include not only those elements explicitly listed but also other elements not explicitly listed or inherent to such processes, methods, products, or devices. In the absence of further limitations, elements specified by the phrase "comprising one . . . " do not exclude the presence of additional identical elements in processes, methods, products, or devices comprising the specified elements.

What is claimed is:

1. A movable fluorescent blood flow monitoring device selectively fixed at a proximal or distal end of a human body, comprising:
    a main body with a darkroom space, wherein the darkroom space is made of flexible material surrounding the main body and forming an open side to conform to the skin of the proximal or distal end of the human body;
    a fixation device positioned on the side of the main body in the form of an elastic strap, for securing the fluorescent blood flow monitoring device to the proximal or distal end of the human body;
    a detection device positioned on the side of the darkroom space away from the proximal or distal end of the human body, further comprising at least two near-infrared LED light sources and a filter receiver; wherein the near-infrared LED light sources are configured to illuminate the skin of the proximal or distal end of the human body to excite fluorescent dye in the blood, and the filter receiver is configured to obtain a fluorescent contrast agent signal by passing fluorescence having a wavelength of 800 nm to 850 nm while blocking light of other wavelengths;

a transmission device positioned within the main body, and electrically connected to the detection device, comprising a wireless communication unit, the wireless communication unit being configured to transmit the fluorescent contrast agent signal to a processing device via wireless communication; and a battery unit positioned within the main body, providing power to the detection device and the transmission device.

2. The movable fluorescent blood flow monitoring device of claim 1, wherein the main body with the darkroom space is a rectangular box made of elastic material, having an open bottom, four concave surfaces conforming to a curvature of limbs, covering the skin to form the darkroom space, and is positioned at any location on a user's limbs for detecting the fluorescent contrast agent signal.

* * * * *